(12) United States Patent
Martz et al.

(10) Patent No.: US 11,480,122 B1
(45) Date of Patent: Oct. 25, 2022

(54) METHODS AND SYSTEMS FOR REDUCING ENGINE EXHAUST EMISSIONS

(71) Applicant: Ford Global Technologies, LLC, Dearborn, MI (US)

(72) Inventors: Jason Brian Martz, Canton, MI (US); Christopher Cundy, Livonia, MI (US); Daniel William Kantrow, Ann Arbor, MI (US); Eric Matthew Kurtz, Dearborn, MI (US); Daniel Joseph Styles, Canton, MI (US); Sathish Atluri, Novi, MI (US); Clayton Mikush, Canton, MI (US); Joshua Zachary Fried, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/303,212

(22) Filed: May 24, 2021

(51) Int. Cl.
| | | |
|---|---|---|
| F02D 41/38 | (2006.01) |
| F02D 41/02 | (2006.01) |
| F02B 75/02 | (2006.01) |
| F01L 13/00 | (2006.01) |
| F02D 41/06 | (2006.01) |
| F01L 13/08 | (2006.01) |
| F01N 13/10 | (2010.01) |
| F02D 41/00 | (2006.01) |

(52) U.S. Cl.
CPC ...... *F02D 41/0235* (2013.01); *F01L 13/0005* (2013.01); *F01L 13/08* (2013.01); *F01N 13/10* (2013.01); *F02B 75/02* (2013.01); *F02B 75/021* (2013.01); *F02D 41/0002* (2013.01); *F02D 41/064* (2013.01); *F02D 41/38* (2013.01); *F02B 2075/027* (2013.01); *F02D 2200/0802* (2013.01); *F02D 2200/10* (2013.01)

(58) Field of Classification Search
CPC ............. F02D 41/0235; F02D 41/0002; F02D 41/064; F02D 41/38; F02D 2200/0802; F02D 2200/10; F01L 13/0005; F01L 13/08; F01L 13/00; F01L 13/10; F02B 75/02; F02B 75/021; F02B 2075/027
USPC .................. 123/299, 300, 198 F, 481, 90.15; 701/103–107
See application file for complete search history.

(56) References Cited

U.S. PATENT DOCUMENTS

| | | |
|---|---|---|
| 4,096,845 A | 6/1978 | Holmes |
| 6,363,907 B1 | 4/2002 | Arai et al. |
| 8,028,665 B2 * | 10/2011 | Ralston .................. F02B 41/06 123/70 R |
| 8,689,541 B2 * | 4/2014 | McDonald .......... F02D 41/3058 60/299 |
| 8,820,049 B2 | 9/2014 | Lewis |
| 2003/0154939 A1 | 8/2003 | Corse |

(Continued)

*Primary Examiner* — Hai H Huynh
(74) *Attorney, Agent, or Firm* — Vincent Mastrogiacomo; McCoy Russell LLP (57) ABSTRACT

Methods and systems are provided for cylinder deactivation to reduce tailpipe emissions and increase exhaust temperature. In one example, a method may include operating a first set of cylinders in a first combustion cycle over modified eight strokes and a second set of cylinders in a second combustion cycle over modified four strokes. Each cylinder in the first set of cylinders may be selectively deactivated via a variable displacement engine (VDE) mechanism while each cylinder in the second set of cylinders may be selectively deactivated via an active decompression technology (ADT) mechanism.

16 Claims, 8 Drawing Sheets

(56) References Cited

U.S. PATENT DOCUMENTS

2005/0131618 A1    6/2005   Megli et al.
2010/0077730 A1    4/2010   Lewis
2017/0356370 A1   12/2017   Doering et al.

\* cited by examiner

METHODS AND SYSTEMS FOR REDUCING ENGINE EXHAUST EMISSIONS

FIELD

The present description relates generally to methods and systems for cylinder deactivation to reduce tailpipe emissions and increase exhaust temperature.

BACKGROUND/SUMMARY

Engine emission control systems may include one or more exhaust catalysts such as three-way catalysts, NOx storage catalysts, and SCR catalysts. At catalyst light-off temperature (e.g., operational temperature), the exhaust catalyst may oxidize and reduce exhaust constituents in an exhaust gas which are then released into the atmosphere. When a temperature of the exhaust catalyst is below the light-off temperature, the exhaust catalyst may not be able to effectively treat the reactive constituents of the exhaust gas, and as a result, emissions may increase and the toxic constituents in the exhaust gas may be directly released into the atmosphere.

One way to maintain temperature of exhaust catalysts above their respective light-off temperatures and reduce exhaust emissions is to operate the engine cylinders with an increased number of strokes to generate a higher amount of heat. One example approach to operate engine cylinders with an adjusted number of strokes is provided by Lewis in U.S. Pat. No. 8,820,049. Therein, the number of cylinder strokes is increased or decreased based on a condition of a catalyst. By increasing the number of cylinder strokes in a cycle of a cylinder, heat continues to be delivered to the catalyst, engine efficiency may be increased, and the catalyst may not reach its oxygen storage capacity. In addition, during conditions when the catalyst temperature falls below a predetermined temperature, the number of cylinder strokes may be increased so that additional heat may be transferred to the catalyst. The number of cylinder strokes in a cycle of an engine may be adjusted based on the capacity and/or the stored amount of oxidants in a catalyst.

However, the inventors herein have recognized potential issues with such a system. As one example, adjustment of a number of cylinder strokes may be selectively carried out by cylinder deactivation. However, technologies such as variable displacement engine (VDE) method wherein cylinders are deactivated by keeping the intake and exhaust valves closed over a cycle, and active decompression technology (ADT) wherein one or more cylinder valves may be held open for an entire cycle, as used for cylinder deactivation, may increase undesirable noise, vibration, and harshness (NVH) in the vehicle. The increased NVH may be due to differences in torque output profile from the active and deactivated cylinders.

In one example, the issues described above may be addressed by a method for an engine comprising: operating a first set of cylinders in a first combustion cycle over eight strokes and a second set of cylinders in a second combustion cycle over four strokes, each cylinder in the first set of cylinders selectively deactivated and reactivated via a variable displacement engine (VDE) mechanism during the first combustion cycle. In this way, by using combination of modified four stroke combustion cycles and modified eight stroke combustion cycles, a uniform engine torque profile may be generated.

As one example, in an eight cylinder engine, the cylinders may be divided into two groups of four cylinders each and the two groups of cylinders may be controlled with separate combustion cycles. The variation in combustion cycles in the different cylinders is carried out using variable displacement engine (VDE) and active decompression technology (ADT®) cylinder deactivation mechanisms to produce gas torques equivalent to those of conventional four stroke operation. Each cylinder in the first group of cylinders may be operated with a first cycle of eight strokes and the VDE mechanism is implemented to adjust valve openings. The intake and exhaust valves may be active for two consecutive engine revolutions, deactivated for two subsequent, consecutive revolutions, and then reactivated for the next two consecutive revolutions. Within the eight strokes, three consecutive compression and expansions strokes are attained. Each cylinder in the second group of cylinders may be operated with a second cycle in an alternating activated/ deactivated sequence. For the cylinders in the second group, a valve lift mechanism may be used to hold valves open by a small amount during deactivation operation. Further, throttling may be adjusted in order to reduce air from the second set of cylinders to mix while one or more cylinders are deactivated.

In this way, by using a combination of eight stroke cycles and four stroke cycles on a V8 engine, the torque profile (output) of the engine may be maintained consistent over time without a difference in torque output due to cylinder activation or deactivation. By maintaining consistent torque output, NVH concerns may be reduced resulting in a smooth engine operation. The technical effect of using cylinder deactivation mechanisms to operate the engine cylinders with eight strokes and four strokes is that exhaust temperature may be increased, NOx emissions may be reduced, and emissions quality may be maintained. By trapping air in the deactivated cylinders, increasing intake throttling, and combining four and eight stroke cycles, exhaust temperature may be increased, and catalyst temperature may be maintained above its light-off temperature. Overall, by adjusting combustion in eight engine cylinders, NOx generation may be reduced while increasing exhaust temperature to maintain functionality of exhaust catalysts.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 6:
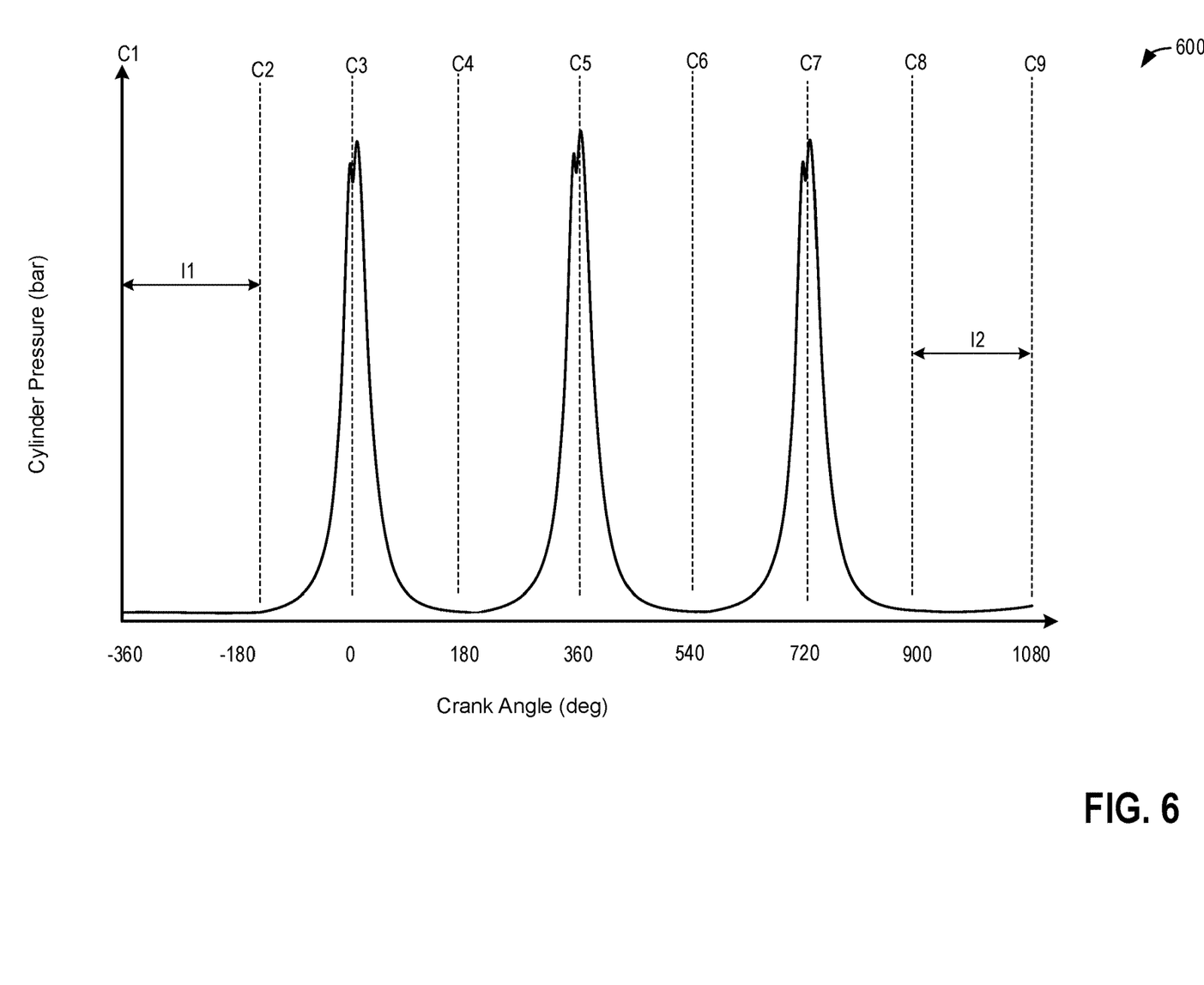
FIG. 6 shows an example plot of pressure variations within a cylinder operated with the first cycle.
Figure 7:
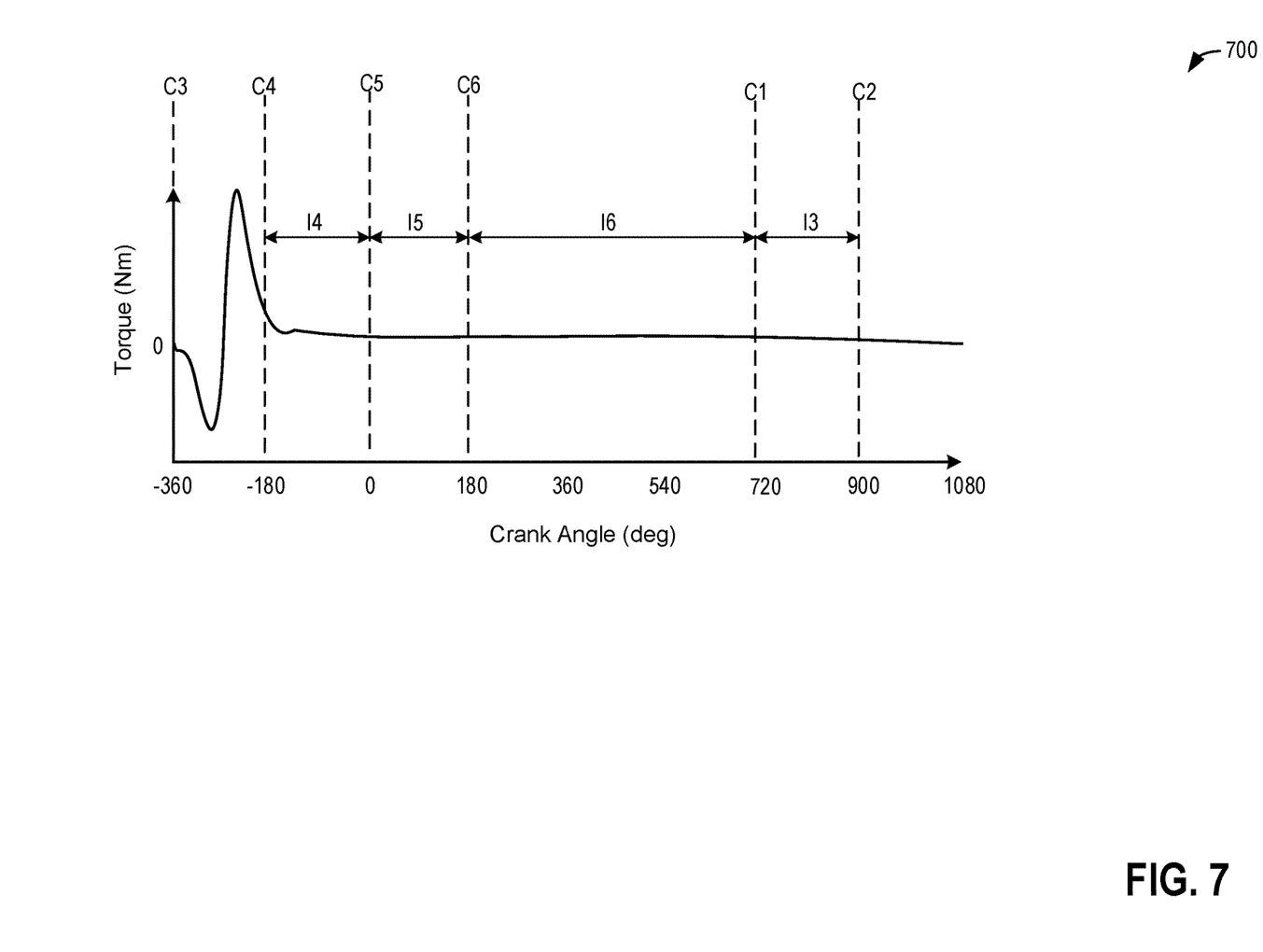
FIG. 7 shows an example plot of output torque of a cylinder operated with the second cycle.
Figure 8:
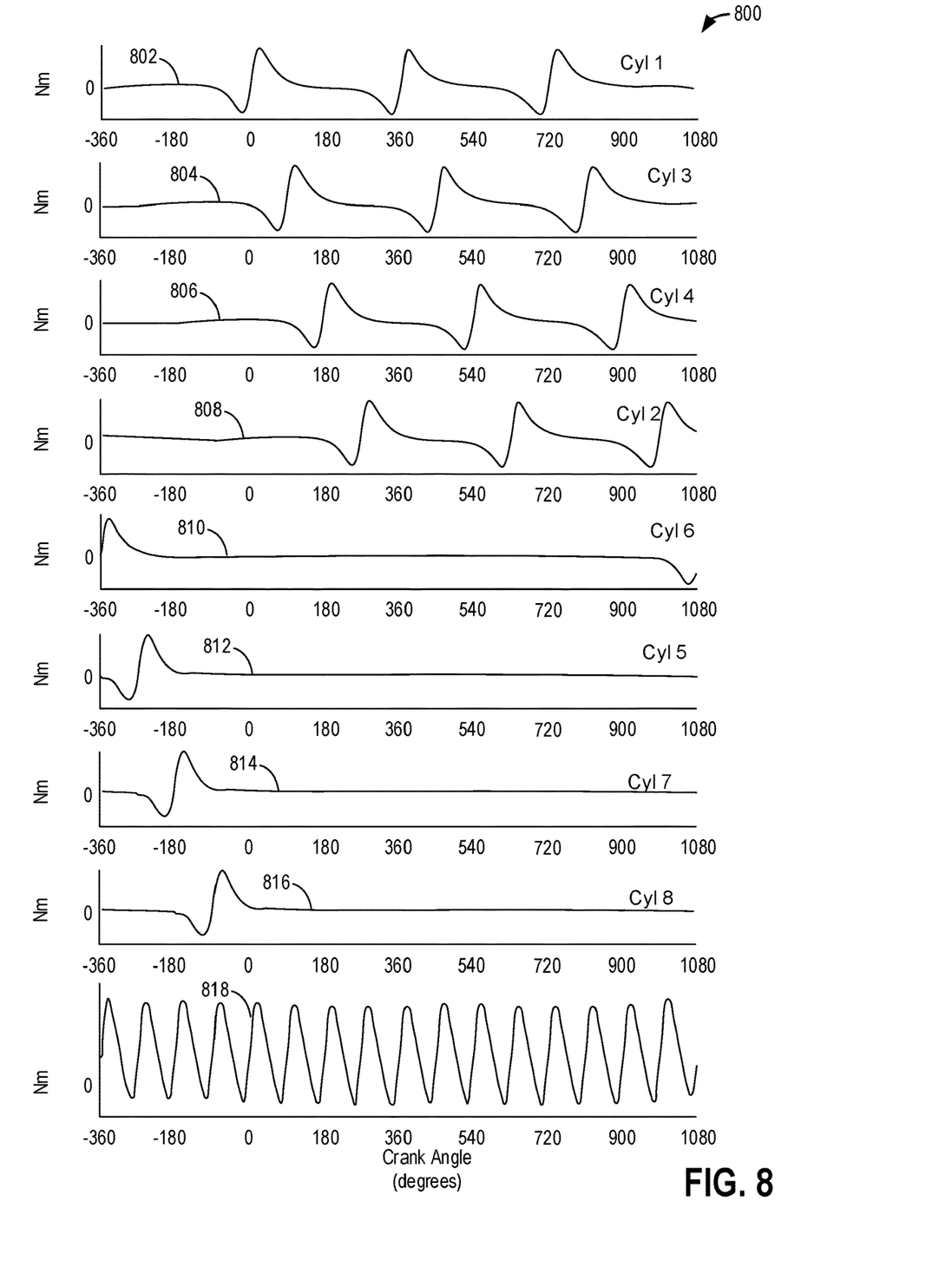
FIG. 8 shows example plots of output torques from each cylinder in an eight cylinder engine and a resultant output torque of the engine.

The following description relates to systems and methods for selective cylinder deactivation to reduce tailpipe emissions and increase exhaust temperature. As described with reference to the engine system of FIGS. 1-2, the selective cylinder deactivation allows for engine operation with a combination of modified eight stroke and four stroke cycles. An engine controller may be configured to perform a control routine, such as the routine of FIG. 3, to operate cylinders with the combination of first and second cycles of modified eight strokes and four strokes, thereby increasing exhaust temperature and decreasing NVH concerns. Example methods for operating a cylinder with the first cycle and the second cycle are elaborated in FIGS. 4 and 5 respectively. FIGS. 6 and 7 receptively show example plots of operation of a cylinder with the first cycle and the second cycle. FIG. 8 shows example plots of torque outputs of each cylinder in an eight cylinder engine together with a resultant balanced torque output for the engine.

Figure 1:
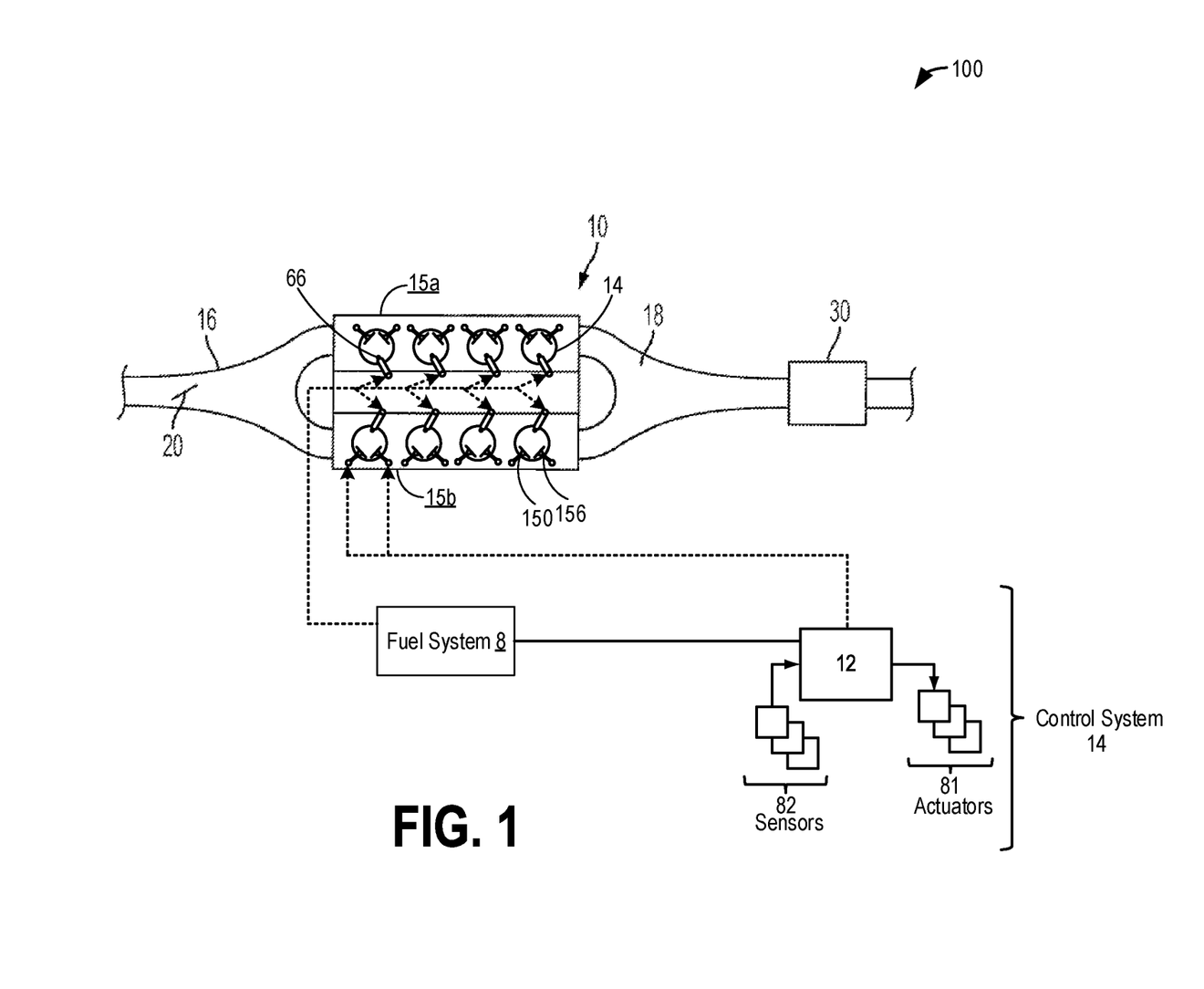
FIG. 1 shows an example embodiment of an engine configured with individual cylinder deactivation mechanisms.

FIG. 1 shows an example embodiment 100 of an engine 10 having a first bank 15a and a second bank 15b. In the depicted example, engine 10 is a V8 engine with the first and second banks each having four cylinders. Engine 10 has an intake manifold 16, with throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

Engine system 10 may have cylinders 14 with selectively deactivatable intake valves 150 and selectively deactivatable exhaust valves 156. In one example, intake valves 150 and exhaust valves 156 are configured for cam actuation (as elaborated at FIG. 2) via individual cam-based cylinder valve actuators. Each engine bank could include one camshaft that actuates the intake and exhaust valves. In an alternate example, each engine bank could include one camshaft actuating intake valves and a separate camshaft actuating exhaust valves. In alternate examples, the valves may be configured for electric valve actuation (EVA) via electric individual cylinder valve actuators. While the depicted example shows each cylinder having a single intake valve and a single exhaust valve, in alternate examples, each cylinder may have a plurality of selectively deactivatable intake valves and/or a plurality of selectively deactivatable exhaust valves.

During selected conditions, such as when the full torque capability of the engine is not needed (such as when engine load is less than a threshold load, or when operator torque demand is less than a threshold demand), one or more cylinders of engine 10 may be selected for selective deactivation (herein also referred to as individual cylinder deactivation). This may include selectively deactivating one or more cylinders on only the first bank 15a, one or more cylinders on only the second bank 15b, or one or more cylinders on each of the first and second bank. The number and identity of cylinders deactivated on each bank may be symmetrical or asymmetrical.

During the deactivation, selected cylinders may be deactivated by closing the individual cylinder valve mechanisms, such as intake valve mechanisms, exhaust valve mechanisms, or a combination of both. Cylinder valves may be selectively deactivated via hydraulically actuated lifters (e.g., lifters coupled to valve pushrods), via a deactivating follower mechanism in which the cam lift following portion of the follower can be decoupled from the valve actuating portion of the follower, or via electrically actuated cylinder valve mechanisms coupled to each cylinder. In addition, fuel flow and spark to the deactivated cylinders may be stopped, such as by deactivating cylinder fuel injectors.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Engine 10 may operate on a plurality of substances, which may be delivered via fuel system 8. Engine 10 may be controlled at least partially by a control system including controller 12. Controller 12 may receive various signals from sensors 82 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors. In addition, controller 12 may receive an indication of cylinder knock from one or more knock sensors distributed along the engine block. When included, the plurality of knock sensors may be distributed symmetrically or asymmetrically along the engine block. Further, the one or more knock sensors may include accelerometers, ionization sensors or in-cylinder pressure transducers.

Figure 2:
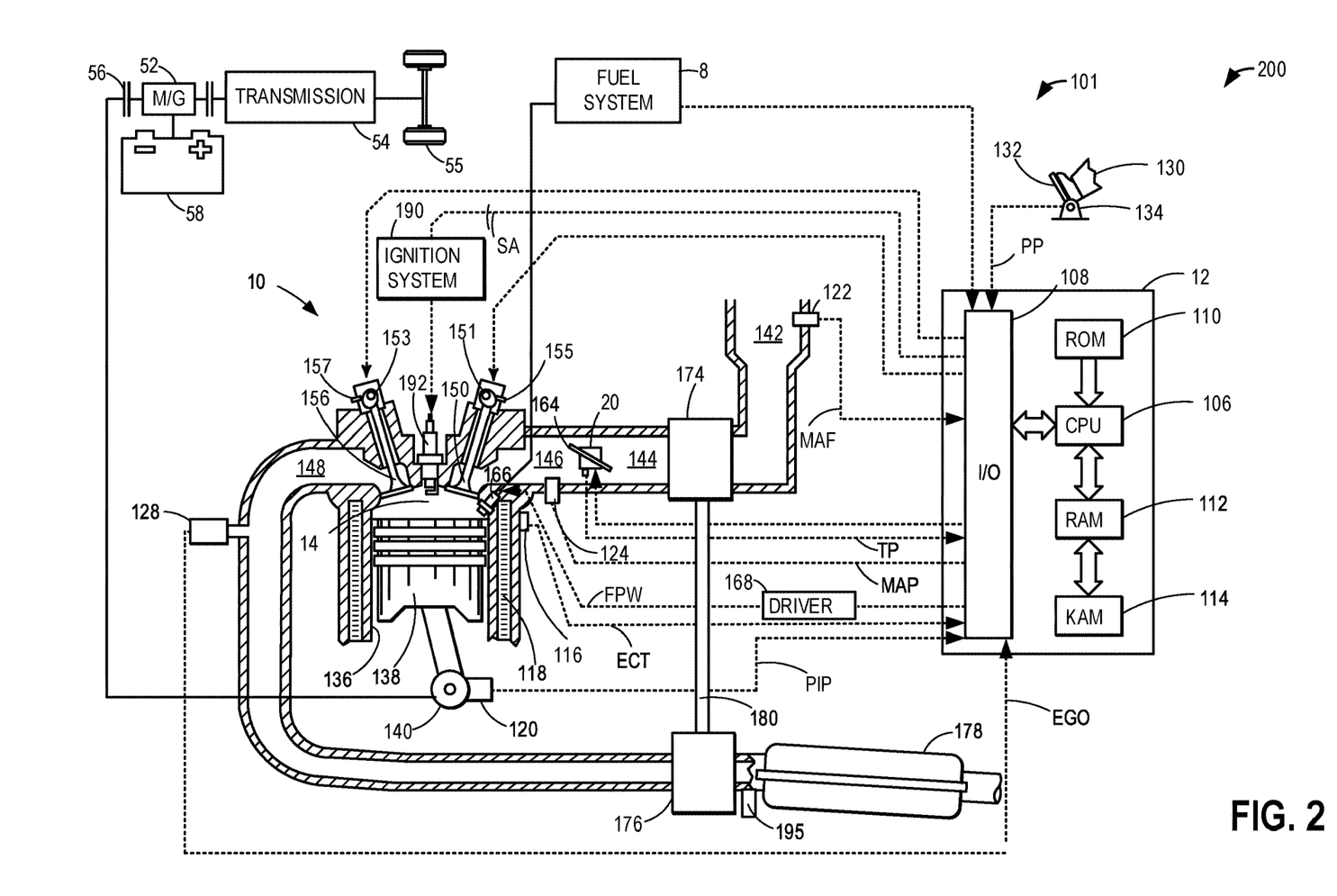
FIG. 2 shows an example engine system including an engine cylinder.

FIG. 2 depicts an example embodiment 200 of a combustion chamber or cylinder of internal combustion engine 10, such as engine 10 of FIG. 1 coupled to a hybrid vehicle 101. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Specifically, piston 138 may be coupled to crankshaft 140 via a piston displacement changing mechanism that moves the pistons closer to or further from the cylinder head, thus changing the size of combustion chamber 14. For example, crankshaft 140 may be configured as an eccentric shaft. In another example, an eccentric may be coupled to, or in the area of, a piston pin, the eccentric changing the displacement of the piston within the combustion chamber. Movement of the eccentric may be controlled by oil passages in the piston rod. It will be appreciated that still other mechanisms that mechanically alter the displacement of the piston within the combustion chamber may be used.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. The intake valve 150 and/or the exhaust valve 156 may be held partially or completely open at a constant lift during a deactivated cycle for the cylinder via an active decompression technology (ADT).

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example.

Emission control device 178 may be a three way catalyst (TWC), NOx trap, oxidation catalyst, selective reduction catalyst, various other emission control devices, or combinations thereof. In addition, a particulate matter filter may be positioned downstream of the emission control device 178. When the engine is started under cold ambient conditions, or when the engine is started after a sufficiently long period of being shutdown (e.g., while the vehicle was being propelled via the motor or while the vehicle was shutdown), the emission control device 178 (e.g., the oxidation catalyst or catalytic converter) may be at a temperature lower than its activation temperature (also known as the light-off temperature). Also, during lower load engine operation due to a decrease in exhaust temperature, the temperature of the emission control device 178 may reduce to below the light-off temperature. As an example, for a diesel powered engine, the exhaust temperature at the emission control device 178 may reduce to below the light-off temperature (such as 230° C.) at engine loads below 3-4 bar BMEP.

Exhaust temperature may be estimated by a temperature sensor 195 located in exhaust passage 148 upstream of the emission control device 178 proximal to the output of the turbine 176. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

In order to maintain the temperature of the emission control device 178 above the light-off temperature, the engine may be operated by using a combination of first cycles (modified eight stroke cycles) and second cycles (modified four stroke cycles). The total number of cylinders may be divided into a first set of cylinders operating with the first cycle and a second set of cylinders operating with the second cycle. Each cylinder in the first set of cylinders may be operated with each of an intake valve and an exhaust valve active for two engine revolutions and then the each of the intake valve and the exhaust valve deactivated for two immediately subsequent engine revolutions. The deactivation of the intake valve and the exhaust valve during the two immediately subsequent engine revolutions may include closing each of the intake valve and the exhaust valve via the VDE mechanism. For each cylinder in the first set of cylinders, the first combustion cycle include may include, a first compression stroke, a first combustion, a first expansion stroke, a second compression stroke, a second combustion, a second expansion stroke, a third compression stroke, a third combustion, a third expansion stroke, an exhaust stroke, and an intake stroke. For each cylinder in the first set of cylinders, fuel may be injected near completion of each of the first compression stroke, the second compression stroke, and the third compression stroke.

Each cylinder in the second set of cylinders may be operated in an alternating active and deactivated sequence via the ADT mechanism. For each cylinder in the second set of cylinders, the second combustion cycle may include a first intake stroke, a compression stroke, a combustion, an expansion stroke, an exhaust stroke, followed by a second intake stroke. The second intake stroke may include an intake valve being held open at a first degree of opening for a 180 degree crank angle followed by the intake valve being held open at a second degree of opening for 360 degrees crank angle, the second degree of opening is less open than the first degree of opening. The intake valve may also be held open during the exhaust stroke of the deactivated cycle for further reduction of exhaust mass flow rates. For a cylinder operating with the second combustion cycle, while the intake valve is maintained open at the second degree of opening via the ADT mechanism, fuel injection and combustion to the cylinder may be suspended. During opening of the intake valve at the second degree of opening, intake throttle opening may be adjusted to reduce air flow among cylinders in the second set of cylinders.

Controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and exhaust temperature from exhaust temperature sensor 195 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIGS. 1-2 and employs the various actuators of FIGS. 1-2 to adjust engine operation based on the received signals and instructions stored on a memory of the controller. For example, cylinder deactivation may be selectively carried out by using the VDE technology wherein the one or more cylinders are deactivated by keeping the intake and exhaust valves closed through a cycle, and/or ADT technology wherein one or more cylinder valves may be held open for a deactivated cycle used.

Non-transitory storage medium read-only memory 110 can be programmed with computer readable data representing instructions executable by processor 106 for performing the methods described below as well as other variants that are anticipated but not specifically listed. In some examples, vehicle 101 may be a hybrid vehicle with multiple sources of torque available to one or more vehicle wheels 55. In other examples, vehicle 101 is a conventional vehicle with only an engine, or an electric vehicle with only electric machine(s). In the example shown, vehicle 101 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

In this way, the systems of FIGS. 1-2 enable a system for an engine in a vehicle, comprising: a controller storing instructions in non-transitory memory that, when executed, cause the controller to: upon temperature of an exhaust catalyst decreasing below a threshold temperature while engine load is lower than a threshold load, operate a first set of cylinders with an first cycle over eight strokes with each cylinder of the first set of cylinders operating with their respective intake valves and exhaust valves deactivated via actuation of a variable displacement engine (VDE) mechanism during a portion of the first cycle; and operate a second set of cylinders with a second cycle over four strokes with each cylinder of the first set of cylinders operating with their respective intake valves held open for four strokes following a four stroke combustion cycle via actuation of an active decompression technology (ADT) mechanism.

Figure 3:
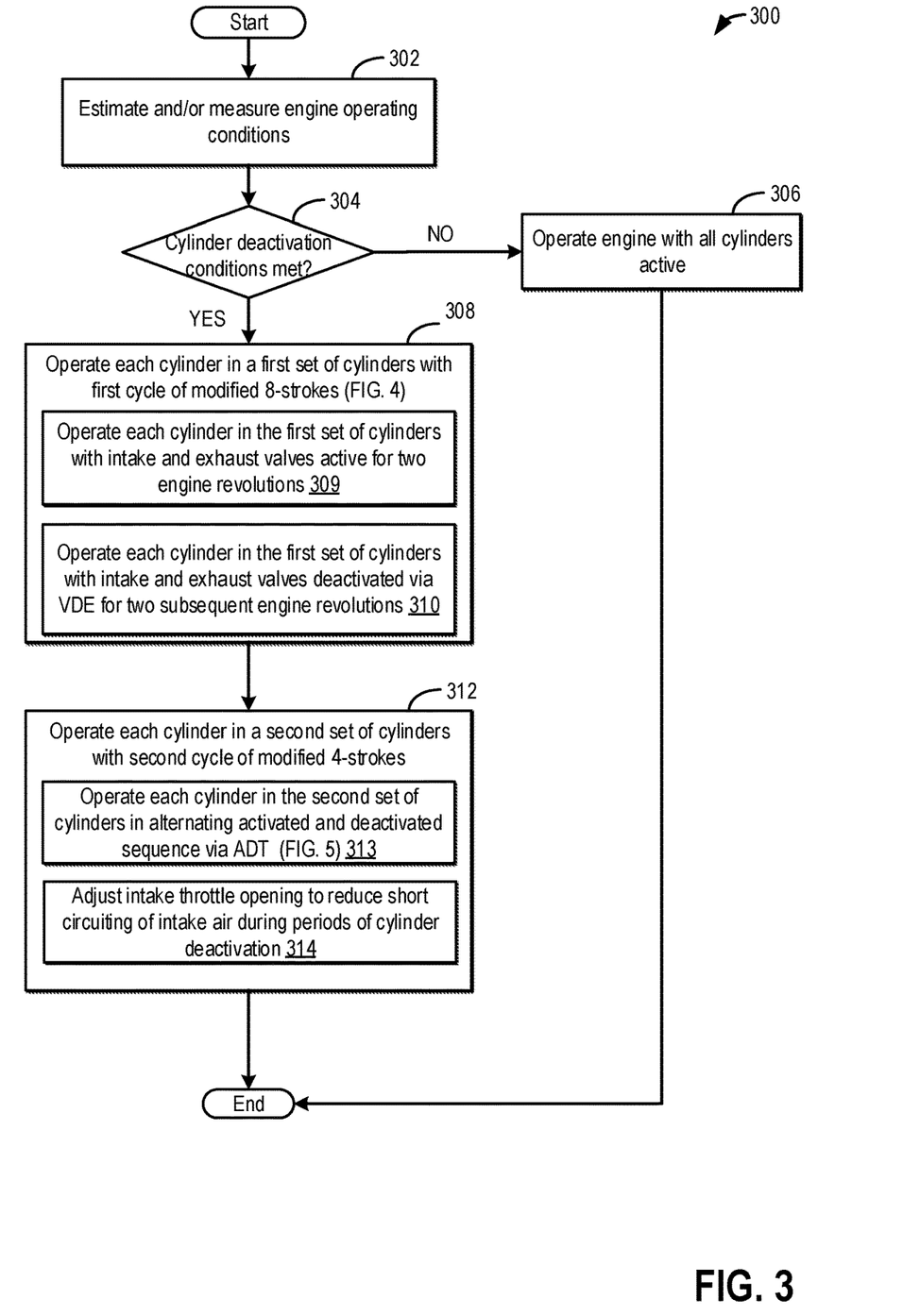
FIG. 3 shows a flowchart for an example method of adjusting combustion cycle in engine cylinders to operate cylinders with a combination of modified eight stroke and modified four stroke cycles.

FIG. 3 shows an example method 300 that may be implemented for adjusting combustion cycles in engine cylinders to operate cylinders with a combination of first cycles (modified eight stroke and four stroke cycles). By operating the engine cylinders with the combination of eight stroke and four stroke cycles, exhaust temperature may be increased and NOx emissions may be decreased while maintaining a balanced engine torque output and lower NVH concerns. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

Method 300 begins at 302 by estimating and/or measuring engine and vehicle operating conditions. Engine and vehicle operating conditions may include vehicle speed, engine speed and load, engine temperature, operator torque demand (for example, from a pedal-position sensor), ambient humidity, ambient temperature, ambient pressure, MAF, a position of the throttle, exhaust temperature, duration (or distance) elapsed since a last engine start, vehicle mode of operation (e.g., whether the vehicle is being operated in an electric mode, engine mode, or assist mode), etc.

At 304, based on the estimated operating conditions, it may be determined if cylinder deactivation conditions have been met. In one example, cylinder deactivation conditions may be considered met if the operator torque demand is less than a threshold torque or if the engine load is less than a threshold load. The threshold torque or the threshold load may be pre-calibrated based on maximum possible torque output from each cylinder. Further, cylinder deactivation may be enabled only if engine coolant temperature is above a threshold temperature to preempt issues related to cold cylinder conditions. Cylinder deactivation may be carried out during lower than threshold exhaust temperature conditions such as during an engine cold-start. The threshold exhaust temperature may be pre-calibrated based on a light-off temperature of one or more exhaust catalysts (such as exhaust after treatment device 178 in FIG. 2). If the exhaust temperature decreases to below the threshold temperature, conversion efficiency of the exhaust catalysts may be compromised and heating of the catalysts may be desired. If cylinder deactivation conditions are not met, at 306, the routine continues engine operation with all cylinders active (that is, in the non-VDE mode) and the routine ends.

If it is determined that conditions are met for cylinder deactivation, at 308, each cylinder in a first set of cylinders may be operated with first cycle consisting of modified eight strokes. All the cylinders in the engine may be divided into two sets, namely a first set and a second set. The number of cylinders in the first and second set may be equal or unequal. In one example, for an eight cylinder engine, four cylinders of a first bank may constitute the first set while the remaining four cylinders of another bank may constitute the second set. Operating each cylinder of the first set with the first cycle may include, at 309, operating each cylinder of the first set with intake and exhaust valves for each cylinder active for two consecutive engine revolutions. Operating each cylinder of the first set with the first cycle may also include, at 310, operating each cylinder of the first set with intake and exhaust valves for each cylinder deactivated via VDE technology for two consecutive engine revolutions immediately following the two active revolutions. While the cylinders are deactivated via VDE technology, the intake and exhaust valves of the respective cylinders may be maintained closed. While a cylinder is deactivated, three consecutive compression and expansion strokes may be carried out and combustion is initiated by direct fuel injection near the end of each compression stroke. The first set of cylinders (operating with first cycle) may trap half of the air mass trapped by the second set of cylinders (operating with second cycle). The amount of fuel injected to each cylinder prior to the combustion events may be adjusted based on engine load and operator torque demand. For the first cycle, each cylinder may be operated close to stoichiometry while significantly reducing particulate emissions relative to a four stroke operation.

In one example, strokes 1 and 2 (such as between −180 to 180 degrees crank angle) may include compression, combustion, and expansion; strokes 2 and 4 (such as between 180 to 540 degrees crank angle) may include compression, combustion, and expansion; strokes 5 and 6 (such as between 540 to 900 degrees crank angle) may include compression, combustion, and expansion; and strokes 7-8 (such as between 900 to −180 degrees crank angle) may include an exhaust and an intake stroke. Operation of an engine cylinder in an eight stroke cycle is elaborated in FIG. 4 and a plot of pressure variations within a cylinder operated with the eight stroke cycle is shown in FIG. 6.

At 312, each cylinder in the second set of cylinders may be operated with a second cycle consisting of modified four strokes. Operating each cylinder in the second set of cylinders with second cycle may include, at 313, operating each cylinder in the second set in alternating activated and deactivated sequence via the ADT technology. For each cylinder, after one cycle of intake, compression, combustion, expansion, and exhaust, the cylinder may be maintained inactive for one full engine cycle (four strokes). While the cylinder is maintained inactive (deactivated) for the entire engine cycle, fuel injection may be suspended but the intake valve may be maintained open via the ADT technology. Due to the alternating between active (firing) and inactive for each cylinder in the second set, the fuel injected per cylinder may be increased and adjusted based on engine load and operator torque demand. The increase in the fuel mass may also result in higher heat generation at each combustion event. The degree of opening of the intake valve while the cylinder is deactivated is smaller than the degree of opening of the intake valve during an intake stroke when the cylinder is active. By maintaining the intake valve open, air may be sucked in and blown out of the intake valve of the cylinder and air may be trapped within the engine cylinders. Operation of an engine cylinder in the modified four stroke cycle is elaborated in FIG. 5 and a plot of output torque of a cylinder operated with the modified four stroke cycle is shown in FIG. 7.

While each cylinder in the second set of cylinders is operated with the second cycle, at 314, intake throttle opening may be adjusted to reduce possible short circuiting of intake air to the exhaust during periods of cylinder deactivation. As the intake valve is held open during alternate engine cycles, intake air from one cylinder may flow directly through the cylinder and into the exhaust when the exhaust valve is open based on the pressure difference between the exhaust and intake manifolds. The position of the intake throttle may be adjusted to reduce this transmission of intake air to the exhaust while combustion is suspended in one or more cylinders. Intake throttling reduces the intake manifold pressure and increases the pressure difference between the intake and exhaust manifolds. In this way, air short circuiting may be reduced across the deactivated cylinders along with increase in exhaust backflow and exhaust mass flow rate. Intake throttling may further increase exhaust temperature.

In this way, upon entry conditions being met, each cylinder in a first set of cylinders may be operated with a first combustion cycle over eight strokes by maintaining each of a first intake valve and a first exhaust valve active for a first four strokes and then maintaining the each of the first intake valve and the first exhaust valve inactive for immediately subsequent second four strokes while continuing combustion; and each cylinder in a second set of cylinders may be operated with a second combusting cycle over four strokes by combusting air and fuel during the first four strokes and then disabling combustion for the immediately subsequent second four strokes. The entry conditions may include a cold-start condition or upon exhaust temperature decreasing to lower than a threshold temperature while an engine load is lower than a threshold load.

Figure 4:
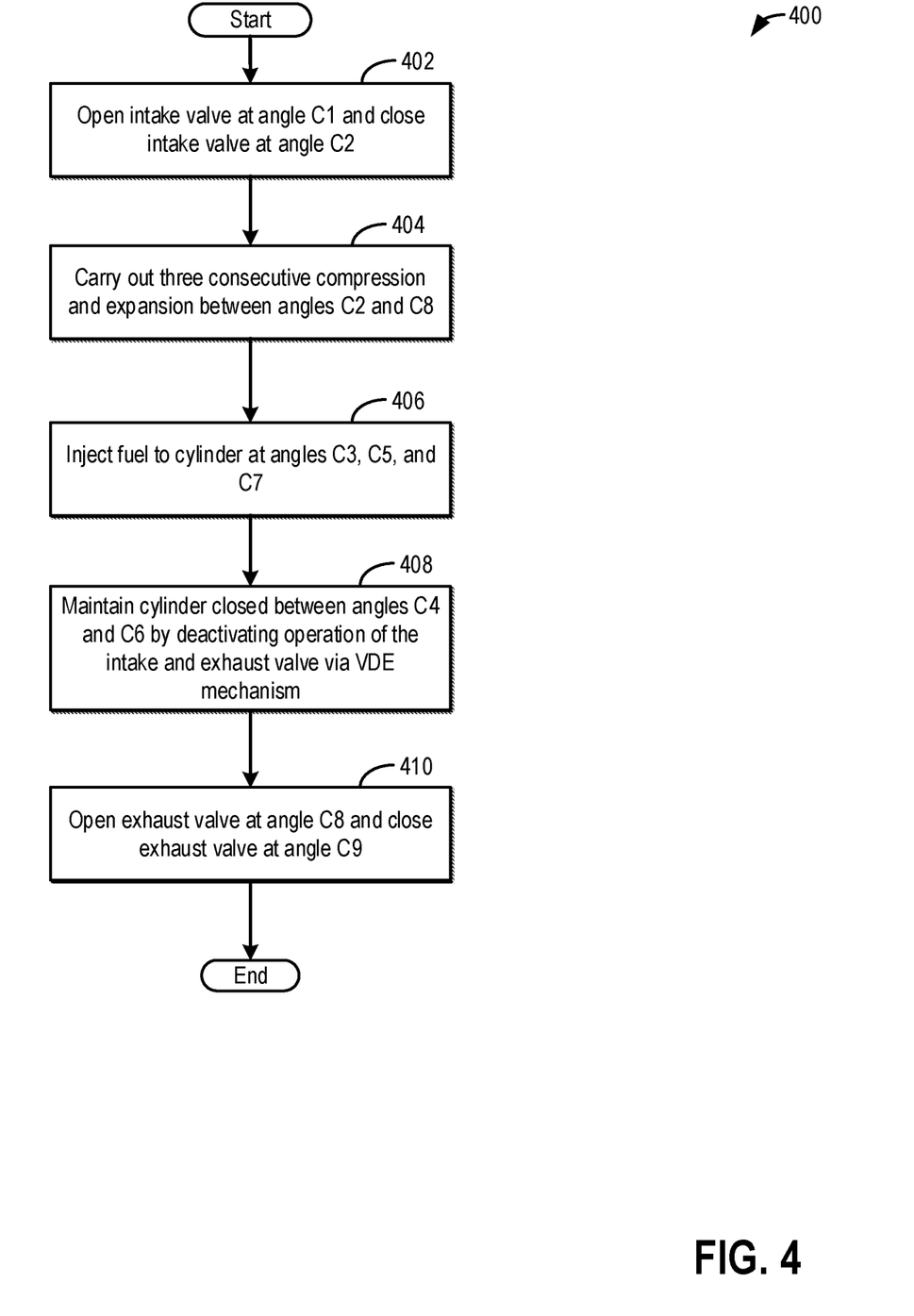
FIG. 4 shows a flowchart for an example method for operating an engine cylinder with a first engine cycle of modified eight strokes.

FIG. 4 shows an example method 400 for operating an engine cylinder with a first cycle consisting of modified eight strokes. The engine cylinder operating with the second cycle may be part of the first set of cylinders as previously mentioned in step 308 in FIG. 3. Each cylinder in the first set of cylinders may follow the modified eight stroke cycle as described in method 400.

FIG. 6 shows example plot 600 of pressure variations within a cylinder operated with the eight stroke cycle. The x-axis denotes crank angles in degrees and the y-axis denotes cylinder pressure in bar.

At 402, the intake valve of the cylinder may be opened at angle C1 and then closed at angle C2. As shown in plot 600, C1 may correspond to −360 degrees and C2 may correspond to −180 degrees, and the intake valve may be held open for the duration I1 between C1 and C2. After closing the intake valve, the cylinder is sealed, and at 404, three consecutive compression and expansion strokes may be carried out between angles C2 and C8 while each of the intake valve and the exhaust valve may be maintained closed. At 406, fuel may be injected to the cylinder at or near the end of each compression stroke such as at angle C3, C5, and C7 before the top dead center (TDC) position of the piston.

As shown in FIG. 6, a first compression may take place between C2 (−180 degrees) and C3 (0 degrees) with a first fuel injection at C3 followed by a first expansion between C3 and C4 (180 degrees). A second compression may take place between C4 and C5 (360 degrees) with a second fuel injection at C5 followed by a second expansion between C5 and C6 (540 degrees). A third compression may take place between C6 and C7 (720 degrees) with a third fuel injection at C7 followed by a third expansion between C7 and C8 (900 degrees).

At 408, the cylinder may be maintained closed between angles C4 and C6 by deactivating operation of the intake and exhaust valves via the VDE mechanism. At 410, the exhaust valve may be opened at angle C8 and closed at angle C9. As shown in FIG. 6, C8 may correspond to 900 degrees and C9 may correspond to 1080 degrees, and the exhaust valve may be held open for the duration I2 between C8 and C9. In this way, a cylinder may be operated with a modified eight stroke cycle with the cylinder being deactivated in between via the VDE mechanism.

Figure 5:
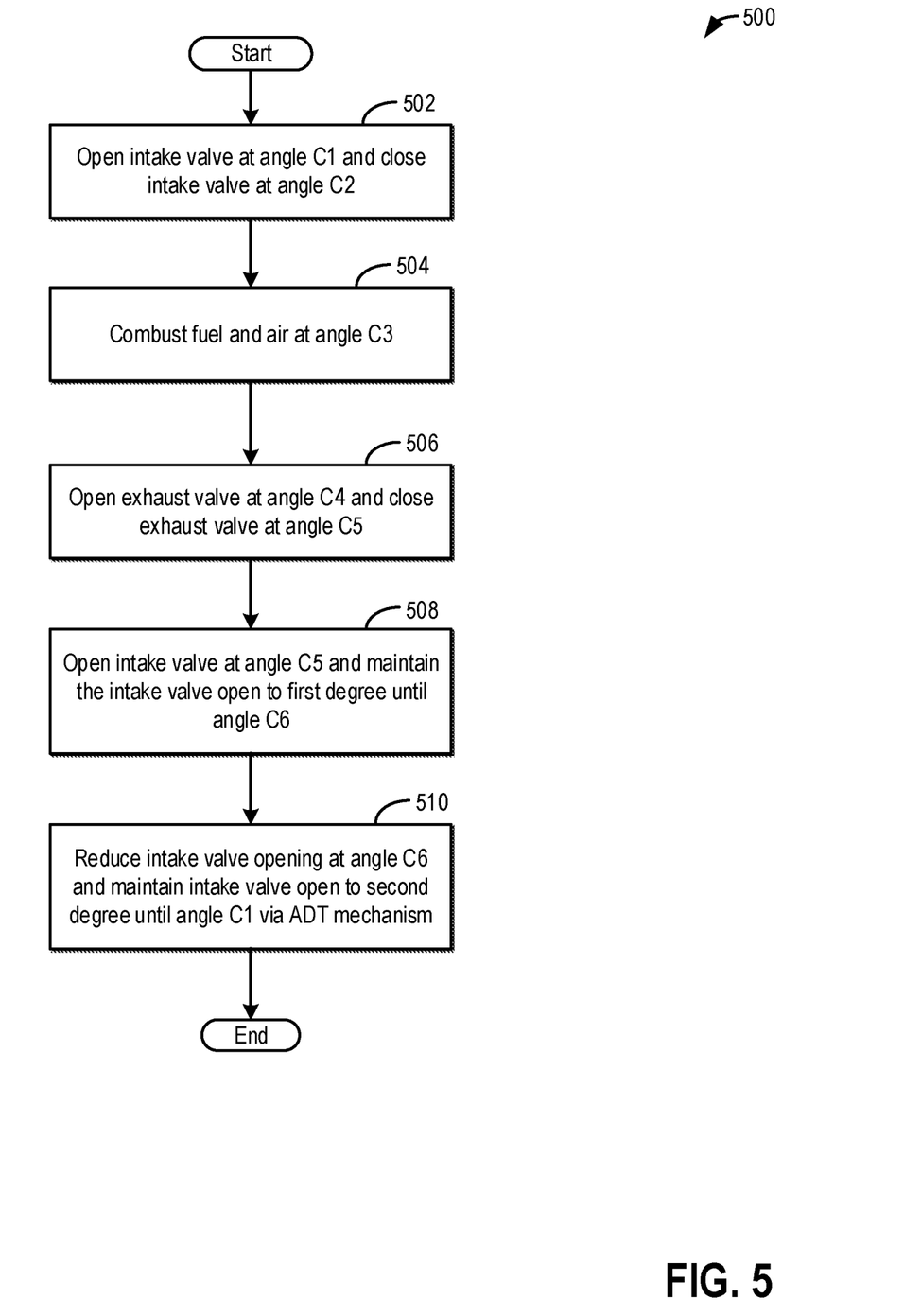
FIG. 5 shows a flowchart for an example method for operating an engine cylinder with a second engine cycle of modified four strokes.

FIG. 5 shows an example method 500 for operating an engine cylinder with the second cycle comprising of modified four strokes. The engine cylinder operating with the second cycle may be part of the second set of cylinders as previously mentioned in step 312 in FIG. 3. Each cylinder in the first set of cylinders may follow the four stroke cycle as described in method 500.

FIG. 7 shows example plot 700 of torque generated (output) by a cylinder operated with the second cycle. The x-axis denotes crank angles in degrees and the y-axis torque in Nm generated by the cylinder. The torque may be directly proportional to the cylinder pressure.

At 502, the intake valve of the cylinder may be opened at angle C1 and then closed at angle C2. Following the closing of the intake valve, the cylinder may go into compression and the torque may be negative as work is done on the gas. Fuel may be injected to the cylinder during the opening of the intake valve. As shown in plot 700, C1 may correspond to 720 degrees and C2 may correspond to 900 degrees, and the intake valve may be held open for the duration I3 between C1 and C2.

At 504, combustion of fuel (gas) and air within the cylinder may be carried out at angle C3 which corresponds to the top dead center (TDC) position of the piston. Following combustion, expansion may occur with positive torque being generated. As shown in plot 700, C3 may correspond to −360 degrees and C4 may correspond to −180. The compression and expansion may occur between C3 and C4.

Following the expansion, at 506, the exhaust valve may be opened at angle C4 and then the exhaust valve may be closed at angle C5. Following the closing of the exhaust valve, at 508, the intake valve may be opened at C5 to a first degree and the opening of the intake valve may be maintained at the first degree until angle C6.

At 510, the opening of the intake valve is reduced from the first degree to a second degree at angle C6. The opening of the intake valve may be maintained at the second degree via the ADT mechanism until angle C1. The second degree of opening may be smaller than the first degree of opening. In one example, the second degree of opening may be about 1 mm. Fuel injection and combustion is not carried out in the cylinder between angle C6 and C1. In this way, the cylinder may be maintained inactive between angle C6 and C1 but the intake valve may be held open. As shown in plot 700, the exhaust valve is held open for a duration I4 between C5 (−180 degrees) and C5 (0 degrees). The intake valve is held open for a duration I5 at the first degree of opening between C5 and C6 (180 degrees) and the intake valve is held open for a duration I6 at the second degree of opening between C6 and C1. Fuel injection and combustion is disabled during the duration of I6 when the intake valve is kept open to a smaller extent via the ADT mechanism.

FIG. 8 shows an example 800 of plots of output torques from each cylinder in an eight cylinder engine and a resultant output torque of the engine. The eight cylinders are divided into two sets with a first set of four cylinders in a first bank being operated with a first cycle of modified eight strokes and a second set of four cylinders in a second bank being operated with a second cycle of modified four strokes.

The first plot, line 802, shows an output torque from a first cylinder which is part of the first set, over four engine revolutions. The second plot, line 804, shows an output torque from a third cylinder which is part of the first set, over four engine revolutions. The third plot, line 806, shows an output torque from a fourth cylinder which is part of the first set, over four engine revolutions. The fourth plot, line 808, shows an output torque from a second cylinder which is part of the first set, over four engine revolutions. The fifth plot, line 810, shows an output torque from a sixth cylinder which is part of the second set, over four engine revolutions. The sixth plot, line 812, shows an output torque from a fifth cylinder which is part of the second set, over four engine revolutions. The seventh plot, line 814, shows an output torque from a seventh cylinder which is part of the second set, over four engine revolutions. The eighth plot, line 816, shows an output torque from an eighth cylinder which is part of the second set, over four engine revolutions. The ninth plot, line 818, shows total output torque for the engine over four engine revolutions. The total output torque is the sum of all torques generated by the eight cylinders at any given crank angle. For each plot, x-axis denotes crank angle in degrees and the y-axis denotes output torque in Nm.

As seen from the top four plots, 802-808, the cylinders are operated with the modified eight stroke cycle where each cylinder is subjected to two active engine revolutions (with the cylinder valves active) followed by two inactive engine revolutions (with the cylinder valves inactive). In each cylinder, three successive expansion and compression events are carried out without opening the intake or exhaust valves in between. The peaks of expansion and compression events (combustion events) do not overlap for any two cylinders allowing for the resultant output torque from each cylinder to be balanced. While the expansion and compression events take place in the first set of cylinders, each cylinder of the second set of cylinders are deactivated via the ADT mechanism such that those cylinders do not contribute to the total output torque and the balance of output torque is maintained.

As seen from the next four plots, 810-816, the cylinders operated with the modified four stroke cycle are subjected to alternate sequence of activated and deactivated condition. For each cylinder, following an intake stroke, a compression stroke, an expansion stroke, and an exhaust stroke, the intake valve is maintained open for the next four strokes via the ADT mechanism. During the window where the intake valves are held open, torque is not generated from the second set of cylinders. The combustion events of the cylinders do not overlap for any two cylinders allowing for the resultant output torque from each cylinder to be balanced. During torque generation from the second set of cylinders, each cylinder of the first set of cylinders are deactivated via the VDE mechanism such that those cylinders do not contribute to the total output torque and the balance of output torque is maintained.

The final plot 818 shows the balanced resultant torque output from the eight cylinders without any significant variations over the four engine revolutions. By maintaining a balanced, uniform torque output even during operation of the engine with one or more cylinders deactivated, NVH concerns are reduced while exhaust temperature is increased.

In this way, by operating an engine with a combination of modified eight stroke cycles and modified four stroke cycles, the exhaust temperature may be increased and NOx generation may be reduced. By increasing exhaust temperature, catalyst light-off during cold-start conditions may be expedited and desired operation of exhaust catalysts may be maintained. The technical effect of using a combination of eight stroke cycles and modified four stroke cycles is that a balanced torque output may be maintained resulting in reduced NVH concerns. Overall, a smoother engine operation and an increased emissions control may be maintained.

An example method for an engine in a vehicle comprises: operating a first set of cylinders in a first combustion cycle over eight strokes and a second set of cylinders in a second combustion cycle over four strokes, each cylinder in the first set of cylinders selectively deactivated and reactivated via a variable displacement engine (VDE) mechanism during the first combustion cycle. In the preceding example, additionally or optionally, each cylinder in the first set of cylinders is operated with each of an intake valve and an exhaust valve active for two engine revolutions and then the each of the intake valve and the exhaust valve deactivated for two immediately subsequent engine revolutions. In any or all of the preceding examples, additionally or optionally, the deactivation of the intake valve and the exhaust valve during the two immediately subsequent engine revolutions includes closing each of the intake valve and the exhaust valve via the VDE mechanism. In any or all of the preceding examples, additionally or optionally, for each cylinder in the first set of cylinders, the first combustion cycle includes, a first compression stroke, a first combustion, a first expansion stroke, a second compression stroke, a second combustion, a second expansion stroke, a third compression stroke, a third combustion, a third expansion stroke, an exhaust stroke, and an intake stroke. In any or all of the preceding examples, additionally or optionally, for each cylinder in the first set of cylinders, fuel is injected upon or near completion of each of the first compression stroke, the second compression stroke, and the third compression stroke. In any or all of the preceding examples, additionally or optionally, each cylinder in the second set of cylinders is operated in an alternating active and deactivated sequence via an active decompression technology (ADT) mechanism. In any or all of the preceding examples, additionally or optionally, for each cylinder in the second set of cylinders, the second combustion cycle includes a first intake store, a compression stroke, a combustion, an expansion stroke, an exhaust stroke, followed by a second intake stroke. In any or all of the preceding examples, additionally or optionally, the second intake stroke includes an intake valve being held open at a first degree of opening for 180 degrees crank angle followed by the intake valve being held open at a second degree of opening for 360 degrees crank angle, the second degree of opening lower than the first degree of opening. In any or all of the preceding examples, additionally or optionally, for a cylinder operating with the second combustion cycle, while the intake valve is maintained open at the second degree of opening via the ADT mechanism, fuel injection and combustion to the cylinder is suspended. In any or all of the preceding examples, additionally or optionally, during opening of the intake valve at the second degree of opening, adjusting throttle opening to reduce air flow among cylinders in the second set of cylinders. In any or all of the preceding examples, additionally or optionally, the engine includes eight cylinder, the first set of cylinders including four cylinders in a first bank of cylinders and the second set of cylinders including four cylinders in a second bank of cylinders. In any or all of the preceding examples, additionally or optionally, the operation of the first set of cylinders in the first combustion cycle and the second set of cylinders in the second combustion cycle is during a temperature of an exhaust catalyst being lower than a threshold temperature and an engine load being lower than a threshold load.

Another example method for an engine, comprises: upon entry conditions being met, operating each cylinder in a first set of cylinders with a first combustion cycle over eight strokes by maintaining each of a first intake valve and a first exhaust valve active for a first four strokes and then maintaining the each of the first intake valve and the first exhaust valve inactive for immediately subsequent second four strokes while continuing combustion, and operating each cylinder in a second set of cylinders with a second combusting cycle over four strokes by combusting air and fuel during the first four strokes and then disabling combustion for the immediately subsequent second four strokes. In the preceding example, additionally or optionally, for the each cylinder in the first set of cylinders, following an opening and closing of the first intake valve, carrying out three consecutive compression and expansion strokes while each of the first intake valve and the first exhaust valve are maintained closed via a variable displacement engine (VDE) mechanism. Any or all of the preceding examples, further comprising, additionally or optionally, for each cylinder in the first set of cylinders, upon completion of each of the three compression strokes, injecting fuel and carrying out combustion. In any or all of the preceding examples, additionally or optionally, for the each cylinder in the second set of cylinders, an opening and closing of a second intake valve is immediately followed by a compression stroke, a fuel injection, a first combustion event, opening and closing of a second exhaust valve, opening of the second intake valve to a first degree for one stroke and then maintaining the second intake valve open to a second degree for four consecutive strokes without fuel injection and combustion. In any or all of the preceding examples, additionally or optionally, the entry conditions include a cold-start condition or upon exhaust temperature decreasing to lower than a threshold temperature while an engine load is lower than a threshold load.

Another example system for an engine in a vehicle, comprises: a controller storing instructions in non-transitory memory that, when executed, cause the controller to: upon temperature of an exhaust catalyst decreasing below a threshold temperature while engine load is lower than a threshold load, operate a first set of cylinders with a first cycle over eight strokes with each cylinder of the first set of cylinders operating with their respective intake valves and exhaust valves deactivated via actuation of a variable displacement engine (VDE) mechanism during a portion of the first cycle, and operate a second set of cylinders with a second cycle over four strokes with each cylinder of the first set of cylinders operating with their respective intake valves held open for four strokes following a four stroke combustion cycle via actuation of an active decompression technology (ADT) mechanism. In any or all of the preceding examples, additionally or optionally, operating each cylinder of the first set includes carrying out three consecutive sets of compressions, combustions, and expansions while the respective intake valves and exhaust valves are maintained closed, and wherein operating each cylinder of the second set includes carrying out a single set of compression, combustion, and expansion followed by their respective intake valves being held open for four strokes. In any or all of the preceding examples, additionally or optionally, the controller includes further instructions to: during operation of the second set of cylinders with their respective intake valves held open for four strokes, adjust opening of an intake throttle to limit flow of intake air from one cylinder to another.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
operating a first set of cylinders in a first combustion cycle over eight strokes and a second set of cylinders in a second combustion cycle over four strokes, each cylinder in the first set of cylinders selectively deactivated and reactivated via a variable displacement engine (VDE) mechanism during the first combustion cycle, wherein for each cylinder in the first set of cylinders, the first combustion cycle includes, a first compression stroke, a first combustion, a first expansion stroke, a second compression stroke, a second combustion, a second expansion stroke, a third compression stroke, a third combustion, a third expansion stroke, an exhaust stroke, and an intake stroke.

2. The method of claim 1, wherein for each cylinder in the first set of cylinders, fuel is injected near completion of each of the first compression stroke, the second compression stroke, and the third compression stroke.

3. The method of claim 1, wherein each cylinder in the second set of cylinders is operated in an alternating active and deactivated sequence via an active decompression technology (ADT) mechanism.

4. The method of claim 3, wherein for each cylinder in the second set of cylinders, the second combustion cycle includes a first intake stroke, a compression stroke, a combustion, an expansion stroke, an exhaust stroke, followed by a second intake stroke.

5. The method of claim 4, wherein the second intake stroke includes an intake valve being held open at a first degree of opening for 180 degrees crank angle followed by the intake valve being held open at a second degree of opening for 360 degrees crank angle, the second degree of opening lower than the first degree of opening.

6. The method of claim 5, wherein for a cylinder operating with the second combustion cycle, while the intake valve is maintained open at the second degree of opening via the ADT mechanism, fuel injection and combustion to the cylinder is suspended.

7. The method of claim 5, wherein during opening of the intake valve at the second degree of opening, adjusting throttle opening to reduce air flow among cylinders in the second set of cylinders.

8. The method of claim 1, wherein the engine includes eight cylinder, the first set of cylinders including four cylinders in a first bank of cylinders and the second set of cylinders including four cylinders in a second bank of cylinders.

9. The method of claim 1, wherein the operation of the first set of cylinders in the first combustion cycle and the second set of cylinders in the second combustion cycle is during a temperature of an exhaust catalyst being lower than a threshold temperature and an engine load being lower than a threshold load.

10. A method for an engine, comprising:
upon entry conditions being met,
operating each cylinder in a first set of cylinders with a first combustion cycle over eight strokes by maintaining each of a first intake valve and a first exhaust valve active for a first four strokes, where the first four strokes begin with in intake stroke, and then maintaining the each of the first intake valve and the first exhaust valve inactive for immediately subsequent second four strokes while continuing combustion; and
operating each cylinder in a second set of cylinders with a second combusting cycle over four strokes by combusting air and fuel during the first four strokes and then disabling combustion for the immediately subsequent second four strokes.

11. The method of claim 10, wherein for the each cylinder in the first set of cylinders, following an opening and closing of the first intake valve, carrying out three consecutive compression and expansion strokes while each of the first intake valve and the first exhaust valve are maintained closed via a variable displacement engine (VDE) mechanism.

12. The method of claim 11, further comprising, for the each cylinder in the first set of cylinders, upon completion of each of the three compression strokes, injecting fuel and carrying out combustion.

13. The method of claim 10, wherein for the each cylinder in the second set of cylinders, an opening and closing of a second intake valve is immediately followed by a compression stroke, a fuel injection, a first combustion event, opening and closing of a second exhaust valve, opening of the second intake valve to a first degree for one stroke and then maintaining the second intake valve open to a second degree for four consecutive strokes without fuel injection and combustion.

14. The method of claim 10, wherein the entry conditions include a cold-start condition or upon exhaust temperature decreasing to lower than a threshold temperature while an engine load is lower than a threshold load.

15. A system for an engine in a vehicle, comprising:
a controller storing instructions in non-transitory memory that, when executed, cause the controller to:
upon temperature of an exhaust catalyst decreasing below a threshold temperature while engine load is lower than a threshold load,
operate a first set of cylinders with a first cycle over eight strokes with each cylinder of the first set of cylinders operating with their respective intake valves and exhaust valves deactivated via actuation of a variable displacement engine (VDE) mechanism during a portion of the first cycle, wherein operating each cylinder of the first set includes carrying out three consecutive sets of compressions, combustions, and expansions while the respective intake valves and exhaust valves are maintained closed, and wherein operating each cylinder of the second set includes carrying out a single set of compression, combustion, and expansion followed by their respective intake valves being held open for four strokes; and
operate a second set of cylinders with a second cycle over four strokes with each cylinder of the first set of cylinders operating with their respective intake valves held open for four strokes following a four stroke combustion cycle via actuation of an active decompression technology (ADT) mechanism.

16. The system of claim 15, wherein the controller includes further instructions to: during operation of the second set of cylinders with their respective intake valves held open for four strokes, adjust opening of an intake throttle to limit flow of intake air into an exhaust manifold.

* * * * *